(No Model.)
A. H. B. & E. H. N. NEFF.
METAL WHEEL.
No. 505,633. Patented Sept. 26, 1893.
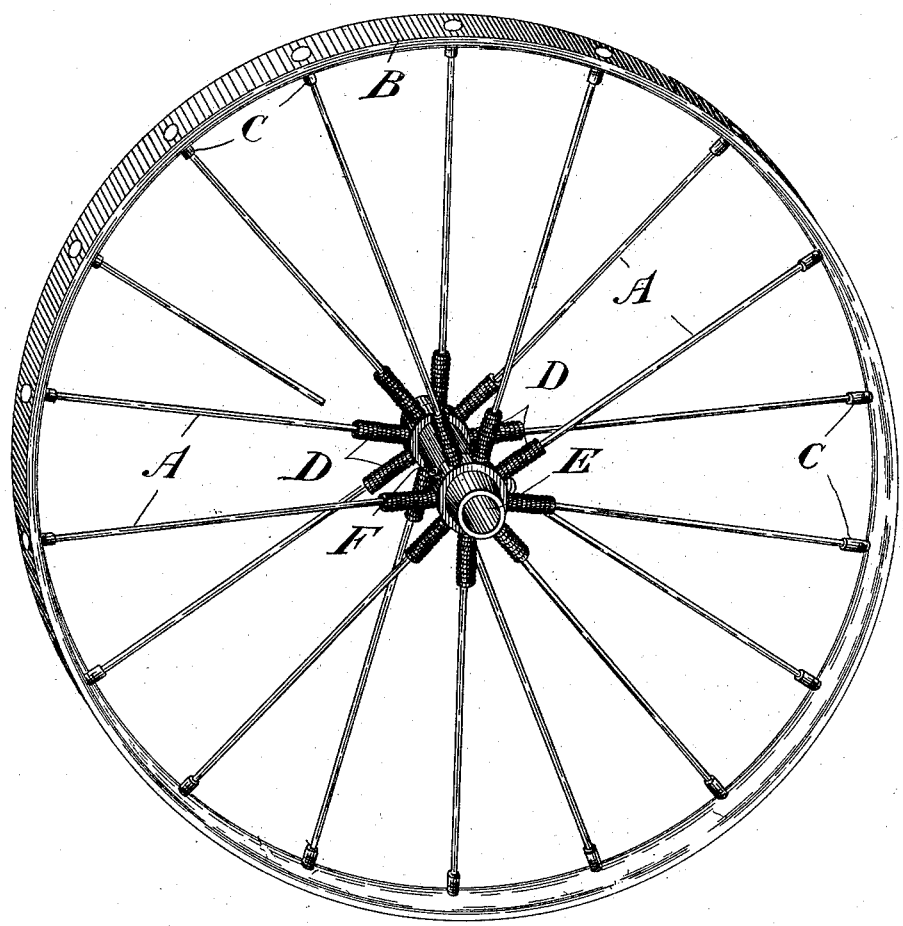
Fig. 1
Fig. 2
Witnesses.
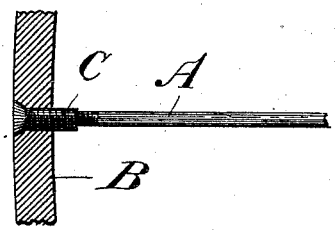
Inventors.
Abram H. B. Neff.
Edmund H. N. Neff.
by Donald C. Ridout & Co.
attys.

UNITED STATES PATENT OFFICE.

ABRAM H. B. NEFF AND EDMUND H. N. NEFF, OF PETERSBURG, CANADA.

METAL WHEEL.

SPECIFICATION forming part of Letters Patent No. 505,633, dated September 26, 1893.

Application filed February 24, 1893. Serial No. 463,534. (No model.)

*To all whom it may concern:*

Be it known that we, ABRAM HARTON BENTON NEFF and EDMUND HENRY NORMAN NEFF, both of the village of Petersburg, in the township of Humberstone, county of Welland, and Province of Ontario, Canada, have jointly invented a certain new and Improved Metal Wheel, of which the following is a specification.

The object of the invention is to produce a light wheel capable of carrying a large range of loads from a very light to an extremely heavy one, presenting in every case an elastic support, and it consists of a wheel having light metal spokes rigidly fastened at one end to the felly, its other end extending through a spiral spring secured at one end to the hub of the wheel and having its other end formed to act as a butt for a collar fixed to the spoke within the spring, substantially as hereinafter more particularly explained and then definitely claimed.

In the accompanying drawings, Figure 1 is a perspective view of our improved wheel. Fig. 2, is a detail partially in section showing the construction of the spoke.

In the drawings—A, represents the spoke; B the felly; C a sleeve screwed into the felly B, and provided with a countersunk head so that it shall be flush with the outside of the felly and also close the end of the sleeve. The end of the spoke A, has a thread cut on it designed to screw into a nut formed on the interior of the sleeve C.

On reference to Fig. 2, it will be observed that the spoke A, is extended through the center of the spiral spring D, which is fixed to the hub E, in any suitable manner, preferably by screwing it onto a projection F, formed on the hub E, the thread on the hub being formed the proper pitch to receive the coils of the spring.

G, is a plug fixed to the outer end of the spring D, and H is a collar fixed to the spoke A, immediately below the plug G.

I, is a head formed in the end of the spoke A, a short distance inside of the hub E.

In constructing our wheel, each spoke is screwed into its sleeve so as to produce the desired strain on its spiral spring D, the same amount of strain being applied to each spoke. When the weight is applied to the hub or center of the wheel, a tension strain is directed against the spokes, each spring D, carrying a portion of the weight. Should the strain at any time be greater on any one spring than it is desired the said spring should sustain, the extra weight is carried by the head I, coming in contact with the interior of the hub, thereby relieving the spring D, of that additional strain.

Although we prefer that each spoke should be connected in the manner described, particularly when the wheel is designed for heavy loads, a large measure of the advantages of our invention will be secured by forming each spring D, in the body of the spoke A, and connecting it to the hub E, in a similar manner to that shown, with the exception that the head I, should butt against the inside of the hub E.

What we claim as our invention is—

1. In a metal wheel, spiral springs secured to the hub thereof, light metal spokes rigidly fastened to the felly and extending through said springs, in combination with the collar and head formed on said spokes, substantially as described.

2. A metal wheel having light metal spokes, each spoke being rigidly fastened at one end to the felly, its other end passing through a spiral spring and fitted within the hub of the wheel, and a head on said spoke adapted to engage with the interior of the hub whereby it takes the strain off the spring, substantially as described.

3. A wheel, projections fixed to the hub, spiral springs secured thereto, a plug G in the free end of each spring, and a series of metal spokes, each spoke being rigidly secured to the rim or felly, the other end of the said spokes passing through said springs and having a collar thereon to engage with said plug and a head to engage with the hub of the wheel, substantially as described.

4. In a metal wheel, a series of projections on the hub having screw threads thereon, a series of spiral springs screwed on said projections, and a series of screw-threaded plugs screwed into the other ends of said springs, in combination with a series of metal spokes each having one end rigidly secured to the rim and the other end passing through one of said springs, and a collar on each of said spokes engaging with one of said plugs, substantially as described.

Petersburg, February 6, 1893.

ABRAM H. B. NEFF.
   EDMUND H. N. NEFF.

In presence of—
 A. L. SCHOLFIELD,
 A. K. SCHOLFIELD.